United States Patent Office 3,482,690
Patented Dec. 9, 1969

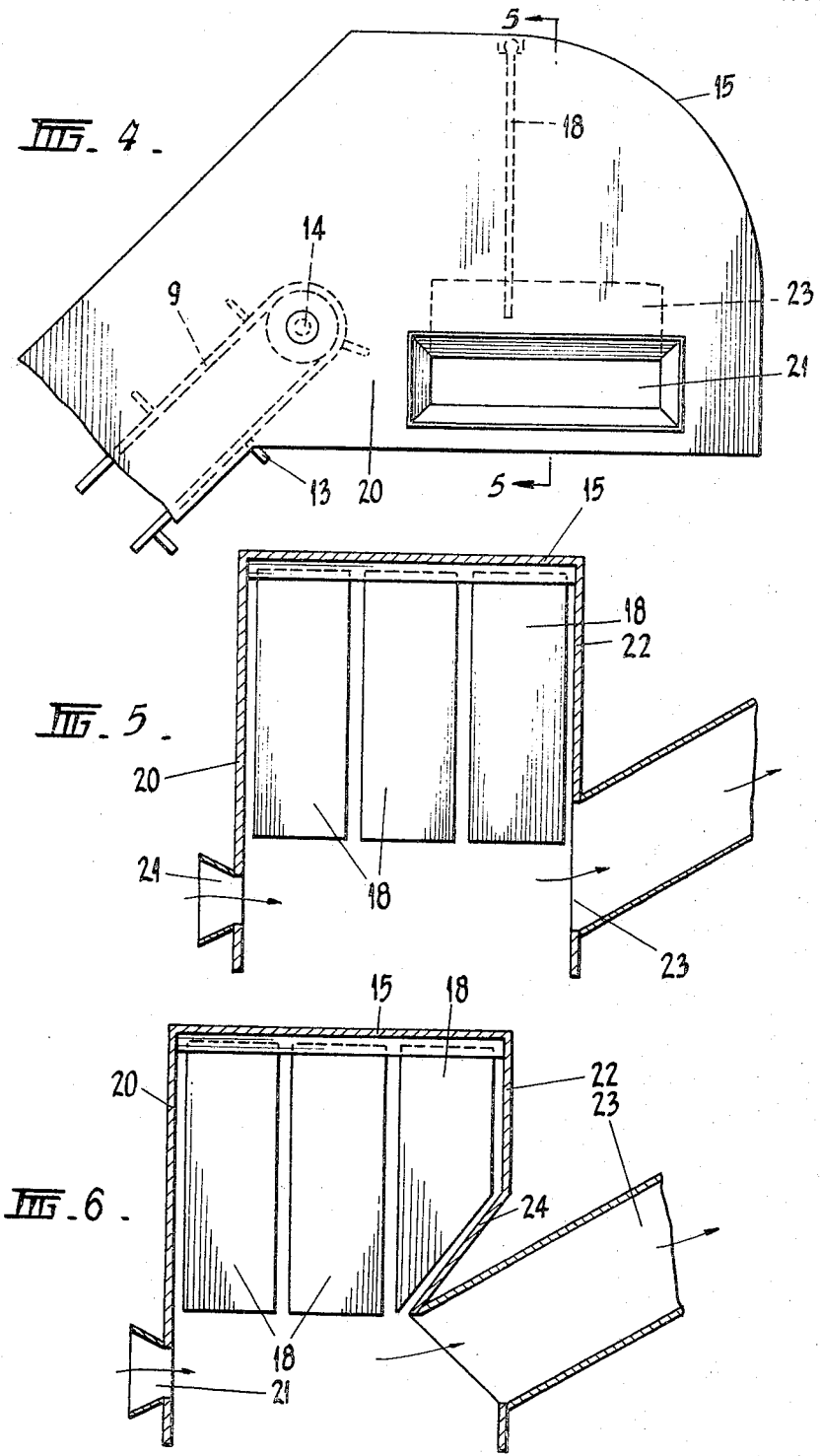

3,482,690
CROP HARVESTER MATERIAL DISTRIBUTION APPARATUS
Keith T. Driller, East Keilor, Victoria, Australia, assignor to Massey-Ferguson (Australia) Limited, Sunshine, Victoria, Australia
Filed Mar. 8, 1968, Ser. No. 711,760
Claims priority, application Australia, Mar. 9, 1967, 18,752
Int. Cl. B07b 7/04, 7/00
U.S. Cl. 209—147                   2 Claims

ABSTRACT OF THE DISCLOSURE

Material separating and distributing apparatus wherein mixed material, such as harvested row crop material, is projected by a conveyor into a hood member having flexible deflecting members extending down from the top of the hood and an air inlet and an outlet in the sides of the hood. A high velocity air stream passes between the inlet and outlet to remove light material such as trash from the total material. Heavier material strikes the deflecting member which itself deflects in accordance with the velocity and mass of the individual crop pieces and causes the same to fall in a distributed manner rather than concentrated pattern.

---

This invention relates to material distribution apparatus and particularly, but not exclusively, to apparatus for the distribution of material delivered from a conveyor or the like.

In many applications, it is desirable to project material to within a confined area even though the material may be delivered at such a velocity that under normal circumstances it would tend to cover a greater area than required. This problem can be overcome partially by positioning a hood in the path of the projected material so as to be impinged upon by the material, thereby limiting in at least one direction the projection of the material. This, however, causes uneven distribution of the material and is unsatisfactory in many applications.

It has been found, when such a hood is used at the upper end of the discharge elevator of a sugar cane harvester, that the tendency is for the cane to drop in closely-bunched or compacted condition from adjacent the outer edge of the hood into a transport trailer. This does not give even distribution of the chopped cane in the trailer.

Additionally, at the discharge position, the chopped cane usually still has mixed with it, a considerable quantity of trash such as leaves from the sugar cane and other foreign material collected during the harvesting operation, and it is desirable that a cleaning operation be carried out as the cane is dropped to the trailer. However, effective cleaning is not possible with the cane in the bunched or compacted condition described above.

It is an object of the present invention to provide means whereby material can be relatively evenly distributed over a particular area.

It is a further object of the invention to provide means whereby material may be caused to pass through separation means in a dispersed condition.

According to one of its aspects the present invention provides material distribution apparatus including means for projecting material to be distributed over a particular area, and a variable obstruction in the path of the projected material on which the material can impinge so that, after striking the obstruction, the material will be distributed over the particular area.

In a preferred form of the invention the variable obstruction includes a surface or surfaces adapted to yield under impact from the projected material.

In one specific form of the invention the yielding surface or surfaces consist of or include flexible baffle means suspended in the path of the projected material.

According to a further specific form of the invention the yielding surface or surfaces consist of or include rigid baffle means pivotally suspended in the path of the projected material.

According to another of its aspects the invention provides means for removing relatively lightweight material from a mass of heavier material comprising means for projecting the material to be cleaned, and a variable obstruction in the path of the projected material on which the material can impinge so that, after striking the obstruction, the material will fall in dispersed condition through a separating zone wherein it is acted upon by an air stream.

In order that the invention may be more readily understood and put into practice, it will now be further described with reference to specific embodiments illustrated in the accompanying drawings wherein:

FIGURE 4 is an elevation similar to that of FIGURE 2 but showing the positions of an air inlet and outlet duct in the side walls of a delivery hood;

FIGURE 5 is a section along lines 5—5 of FIGURE 4;

FIGURE 6 is a view similar to FIGURE 5 illustrating a further form of the invention.

In the remainder of this description the invention will be considered as applied to the delivery elevators of sugar cane harvesters, and the material to be treated will be considered to be pieces of chopped sugar cane mixed with trash such as leaves from sugar cane and other foreign material collected during the harvesting operation.

Figure 1:
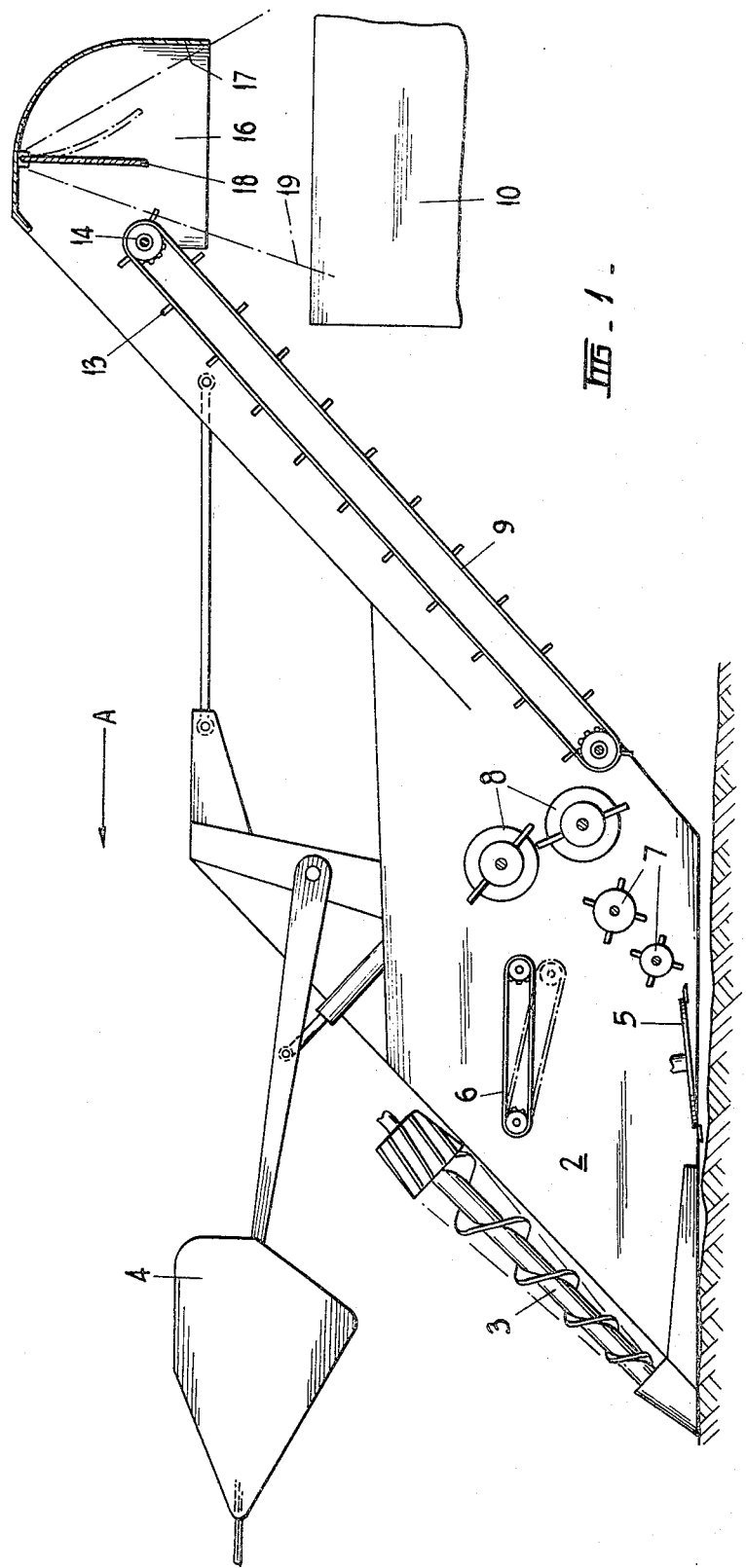
FIGURE 1 is a side elevation of a sugar cane harvester to which the invention is applied.

As shown in FIGURE 1, a sugar cane harvester side-mounted on a tractor (not shown) and suitably supported on the ground, includes a gathering wall 2 having a crop-gathering auger 3 positioned above the gathering wall. A sugar cane top-cutting mechanism is indicated generally at 4 whilst the base cutter is in the form of a substantially horizontally mounted disc 5.

The cane, after having been topped and cut at its base, is fed by throat conveyor 6 and a paddle conveyor 7 through a cane-chopping mechanism 8. Thereafter, the chopped cane and entrained trash is fed by elevating conveyor 9 to be delivered to a collection bin 10.

Figure 2:
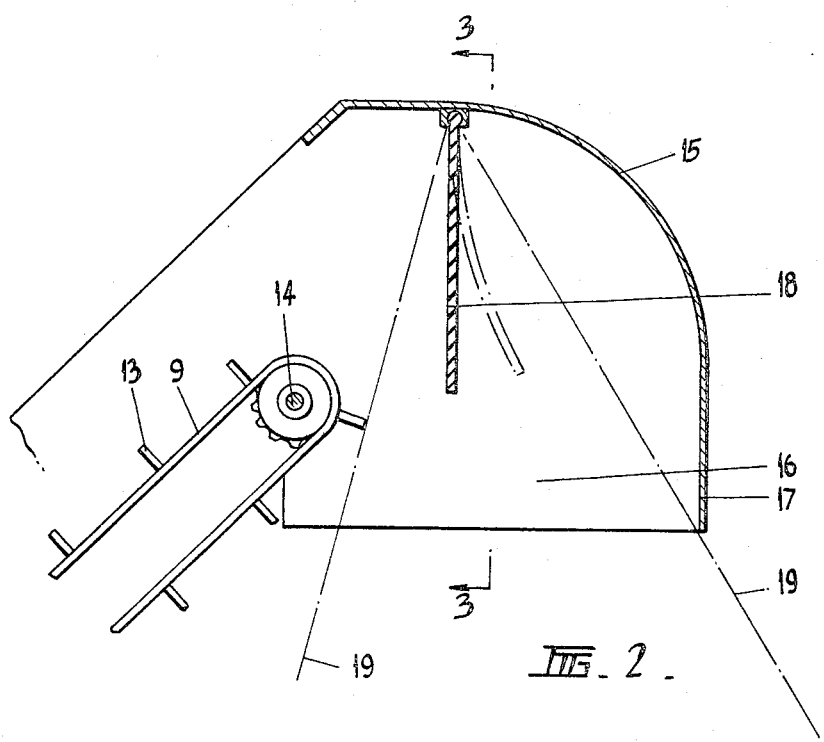
FIGURE 2 is a side elevation to an enlarged scale of a particular arrangement of the apparatus at the head of a delivery elevator of the sugar cane harvester.
Figure 3:
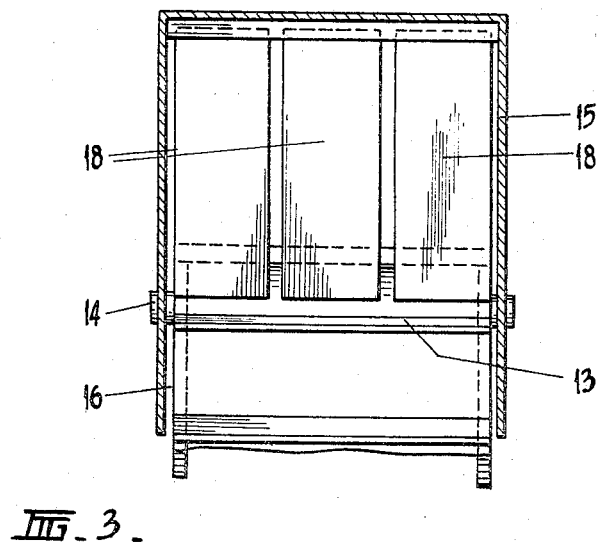
FIGURE 3 is a section on line 3—3 of FIGURE 2.

In FIGURE 2 there is shown to an enlarged scale, a portion of the cane elevator 9 which is a slat conveyor having slats 13 and passing over a head pulley 14. The slats 13 retain the cane pieces and ensure that they are fed upwardly during operation of the elevator.

Mounted above and extending downwardly below the top of elevator 9 is a hood 15 which may be of sheet metal and which provides a delivery opening 16 between the elevator and an outer edge 17 of hood 15. The cane pieces fall through opening 16 to the bin 10 positioned therebelow.

In conventional harvesters, the speed of the elevator 9 may be such that much of the cane impinges upon the hood 15 and drops to the bin from closely adjacent to the outer edge 17. In harvesting conditions where a quantity of light material is mixed up with the cane pieces, it is advantageous to remove this contaminent by passing the cane through a strong current of air which carries away the trash.

This operation is most conveniently carried out when the chopped cane is in free flight after discharge from an elevator or discharge point. When the stream of material discharged from the elevator is closely bunched and compacted it is difficult to penetrate the falling material and blow out the light trash. It is therefore clear that an arrangement in which most of the cane drops from a position closely adjacent edge 17 is unsatisfactory, both from the point of view of distribution of the chopped cane in bin 10, and from the point of view of cleaning it as it is dropping to the bin.

In the present invention the cane is more evenly distributed and dispersed by providing an obstruction in the form of a variable surface which, in the form illustrated in FIGURE 2, is composed of a plurality of straps 18 mounted on the underside of the hood 15 and extending across the width of the conveyor 9. A suitable location for these straps can be seen in FIGURE 2.

The form and positioning of the straps is readily variable, and in practice straps of flexible material such as leather or rubber are satisfactory as are straps of synthetic plastic material.

Depending on the material and the likely velocity of the cane pieces, the lower portion of the straps may be weighted so that the absorption of the kinetic energy of the cane pieces can be increased without the straps being displaced a great distance.

It will be appreciated that the displacement of the straps is dependent upon the weight of the cane pieces delivered, the speed of delivery of the cane pieces, the position at which the pieces strike the straps, and the weight of the straps.

When the straps are fitted to the underside of the hood, the distribution of the cane pieces can be considered to be effectively within the chain lines 19 shown in FIGURE 2, and thus it can be seen that, when this cane falls towards the bin, there is relatively evenly spread distribution compared with the concentrated distribution previously achieved.

The arrangement illustrated in FIGURE 4 is generally similar to that of FIGURE 2, having an elevator 9 with slats 13 and passing over a top pulley 14, a hood 15, and straps 18. In this arrangement there is provided, in one side wall 20 of the hood 15, an air duct aperture 21 through which a stream of high-speed air may be introduced into the hood 15 across the path of the cane at a point down-stream of the straps 18.

The air duct, which is not shown except for the entrance aperture 21, may come from any suitable source of high velocity air and in normal operation a suitable blower can be driven from one of the shafts of the harvester or a separate drive can be provided to drive such a blower. Also, the blower can be closely adjacent to the aperture 21 or can be connected thereto by a length of ducting. Normally, the provision of ducting will be more satisfactory in practice when the invention is applied to a cane elevator which transmits the cane from the body of the harvester to a position spaced therefrom and spaced thereabove.

In wall 22 of the hood 15, opposite the inlet aperture 21 in wall 20, there is provided (see FIGURE 5) an outlet duct 23 which, as can be seen, is directed upwardly and outwardly away from the hood 15.

In the operation of this embodiment, the chopped cane pieces and the trash are delivered from the conveyor 9 and strike the straps 18. This causes the cane pieces to be dispersed in the manner described in relation to FIGURE 2. The dispersed material passes through the air stream travelling across the path of the cane from the inlet aperture 21 to the outlet duct 23, and the trash is carried by the air stream to exhaust while the heavier cane pieces drop through the air stream and are delivered to the collection bin 10. In this way, the cane pieces delivered to the bin are relatively "clean" as compared with the cane delivered to the bin in the earlier embodiment.

Should it be so desired, the outlet duct 23 can be provided with an extension to ensure that the trash does not fall into the bin.

In a further embodiment illustrated in FIGURE 6 the general arrangement is similar to that of the embodiment illustrated in FIGURES 4 and 5 in that the hood 15 has the straps 18, the inlet aperture 21 in the wall 20 and the outlet duct 23 in the wall 22. The embodiment differs from the previous one in that a sill 24 is provided adjacent to the inlet to the duct 23 and the provision of the sill necessitates a re-shaping of one of the straps 18. This sill causes a further alteration of the diffusion pattern of the cane pieces and the trash as they leave the straps 18 in that the pieces striking it are moved toward the inlet aperture 21 and thus the air impinging on the cane and trash has a greater space through which to impart sufficient velocity to the trash than is the case in the previous embodiment where the air is impinging on cane and trash closely adjacent to the discharge outlet. Also, the movement of the cane pieces towards the air inlet aperture 21 reduces the possibility of their being ejected by the air stream through the trash outlet duct 23.

Although three embodiments of the invention have been described in relation to the delivery elevator of a sugar cane harvester, modifications can be made in the particular physical arrangement when applied to sugar cane harvesters and, further, the invention is applicable to other types of equipment.

It is also satisfactory to use instead of the straps, chain or mesh and if required instead of providing only three straps as shown across the width of the conveyor a larger number of narrower straps may be provided.

Alternatively, it is quite acceptable to provide rigid baffles which are pivotally attached to the underside of the top of the hood so that on impact by cane pieces the strap moves about its pivot and thus its potential energy increases.

I claim:

1. Apparatus for removing relatively light-weight material from a mass of heavier material comprising conveyor means for projecting the material to be cleaned into a hood member, a yieldable obstruction in the path of the projected material on which the material projected from said conveyor can impinge so that, after striking the obstruction, the material will fall in dispersed condition through a separating zone wherein it is acted upon by an air stream moving transversely to the path of said projected material, said air stream provided by an air inlet in one side wall of the hood and an air outlet in the opposite side wall of the hood and means for directing a high velocity air stream through said inlet towards said outlet and transversely across said separating zone.

2. The apparatus of claim 1 wherein said variable obstruction comprises a plurality of flexible strap-like members fastened to the top of the hood and extending down into the path of material projected from said conveyor.

(References on following page)

References Cited

UNITED STATES PATENTS

| | | | |
|---|---|---|---|
| 694,430 | 3/1902 | Schroeder | 209—143 |
| 1,742,812 | 1/1930 | Honeycutt | 209—135 |
| 1,792,962 | 2/1931 | Barker | 209—135 |
| 2,128,848 | 8/1938 | Rafeno | 209—115 X |
| 2,280,903 | 4/1942 | Ellison | 209—143 X |
| 2,645,821 | 7/1953 | Fowler | 209—143 X |
| 3,354,923 | 11/1967 | Voler. | |

FOREIGN PATENTS

| | | |
|---|---|---|
| 110,914 | 6/1944 | Sweden. |
| 215,208 | 7/1956 | Australia. |
| 507,671 | 12/1954 | Italy. |

HARRY B. THORNTON, Primary Examiner

ROBERT HALPER, Assistant Examiner

U.S. Cl. X.R.

209—153; 302—19